(12) United States Patent
Ishida et al.

(10) Patent No.: US 6,207,786 B1
(45) Date of Patent: Mar. 27, 2001

(54) TERNARY SYSTEMS OF BENZOXAZINE, EPOXY, AND PHENOLIC RESINS

(75) Inventors: Hatsuo Ishida, Shaker Heights; Sarawut Rimdusit, Cleveland, both of OH (US)

(73) Assignee: Edison Polymer Innovation Corporation, Akron, OH (US)

(*) Notice: Subject to any disclaimer, the term of this patent is extended or adjusted under 35 U.S.C. 154(b) by 0 days.

(21) Appl. No.: 09/189,523

(22) Filed: Nov. 10, 1998

(51) Int. Cl.$^7$ ...................................................... C08G 59/50
(52) U.S. Cl. ............................................... 528/94; 528/403
(58) Field of Search ........................................ 528/94, 403

(56) References Cited

U.S. PATENT DOCUMENTS 5,543,516 * 8/1996 Ishida .

FOREIGN PATENT DOCUMENTS

1115772 * 1/1996 (CN) .
10204255 * 8/1995 (JP) .

OTHER PUBLICATIONS

Hackh's Chemical Dictionary, p. 91, 1974.*
JP 11158352A abstract, *Hitachi Chem Co. LTD,* Jun. 15, 1999.
JP 10204255A abstract, *Hitachi Chem Co. LTD,* Aug. 4, 1998.
CN 1115772A abstract, *Univ. Sichuan Union,* Jan. 31, 1996.

* cited by examiner

*Primary Examiner*—Robert Dawson
*Assistant Examiner*—D. Aylward
(74) *Attorney, Agent, or Firm*—Hudak & Shunk Co., L.P.A.

(57) ABSTRACT

Low viscosity ternary mixtures of benzoxazine, epoxy and phenolic resins have been developed. The blends render homogeneous and void free cured specimen with a wide range of properties. Melt viscosity values as low as 0.3 Pa.s at 100° C. can be achieved. The phenolic resin acts as a cure accelerator to the system, besides its typical function as a hardener of epoxy resin. Glass transition temperatures Tg as high as 170° C. can also be obtained.

20 Claims, No Drawings

TERNARY SYSTEMS OF BENZOXAZINE, EPOXY, AND PHENOLIC RESINS

FIELD OF INVENTION

Ternary systems of benzoxazine, epoxy, and phenolic resins are useful in electronic equipment where they can function as underfilling between a circuit and a substrate. The epoxy acts as a viscosity reducing reactive diluent and crosslink enhancer. The phenolic resin can function as a polymerization catalyst for the benzoxazine and/or a hardener for the epoxy resin. Benzoxazine increases the Tg and decreases water up-take as well as all the usual advantages of benzoxazine over epoxies and phenolics.

BACKGROUND

Epoxy resins with various hardeners have been used extensively in the electronics industry both as adhesives and as a matrix in various substrates. Mixtures of epoxy resins and benzoxazines have been taught as potentially useful in the electronics industry as the epoxy resins can reduce the melt viscosity of benzoxazines allowing for the use of higher filler loading while maintaining a processable viscosity. However the epoxy resin undesirably increase the temperature at which the benzoxazine polymerizes.

SUMMARY OF INVENTION

Ternary blends of benzoxazine, epoxy and phenolic resin or phenolic molecule were found to have a wide range of desirable properties not generally achievable with simple blends of any two components. The benzoxazine resin imparts mechanical strength, low water uptake, and thermal curability to the blend. The epoxy resin imparts increased crosslink density and lower viscosity to the blend. The phenolic resin provides a lower polymerization temperature for the benzoxazine and improved thermal stability when substituted for the epoxy component. The benzoxazine increases the thermal stability of the ternary blend thus opening the possibility of lower filler loading (typically added for higher modulus and flame retardency) with equivalent physical properties and low flammability. The epoxy can also raise the Tg of the blend due to higher crosslink density.

The benzoxazine and the phenolic resin impart exceptional thermal stability to the blend as these two components generally have good thermal stability to weight loss up to about 370° C. The tendency for benzoxazines and phenolic resins not to support flame propagation makes the ternary blend a desirable material in applications where flammability is to be avoided.

DETAILED DESCRIPTION

Desirable blends of benzoxazine, epoxy and phenolic resins include from about 10 to about 80 weight percent of benzoxazine monomer, from about 10 to about 80 weight percent of an epoxy reactant, and from about 1 or 10 to about 80 weight percent of a phenolic resin or a phenolic molecule. The ternary system can be used in conjunction with known catalysts for benzoxazine, phenolic, and/or epoxy, while phenolic component also acts as an initiator and catalyst for both benzoxazine and epoxy resins. The phenolic resin or phenolic molecule can be used in a lower amount than the other components due to its ability to act as a catalyst for the benzoxazine polymerization and as a hardener for the epoxy reactant. When the phenolic resin is used in a larger amount, e.g. above 10 weight percent of the blend, it can function both as a part of the matrix and as catalyst and/or hardener. The weight percents are based on the blend of the benzoxazine monomer, the epoxy reactant and the phenolic resin or molecule.

A more preferred range for the benzoxazine monomer would be from about 10, 15 or 20 to about 60, 65 or 70 weight percent of the blend of the three components. The benzoxazine imparts to the blend good thermal curability, high mechanical properties such as strength, and low water uptake on exposure to moisture or water.

A more preferred range for the epoxy reactant would be from about 10 or 20 to about 60, 65 or 70 weight percent of the blend. The epoxy reactant provides improved crosslink density, low melt viscosity, flexibility, and possibly enhanced adhesion to polar substrates. Desirably the epoxy resin is used in an amount sufficient to lower the melt viscosity of the benzoxazine to below 1 Pa.s or below the melt viscosity of the benzoxazine component alone at 100° C. Rheometrics RMS-800 with 50 mm diameter parallel plate fixture, 200 gom torque force rebalance transducer, 100° C., and a shear rate of 6.3 reciprocal seconds. Epoxy resins may detract from water resistance as they pick up water.

A more preferred range for the phenolic resin or molecule would be from about 1, 2, 3, 5, or 20 to about 50 or 60 weight percent of the blend. The phenolic resin or molecule functions as a catalyst lowering the polymerization temperature of the benzoxazine monomer, functions as a hardener for the epoxy resin, and can serve as an additional matrix resin.

The blend of the three above components can be formulated with a variety of other components to achieve utility for specific applications. The blend is desirable due to its high Tg, good thermal stability, low melt viscosity, ability to be filled with fillers, good adhesion etc. It is particularly applicable in electronics as an underfilling. Underfilling is a plastic molding compound that goes into a gap between an integrated circuit or die and the substrate. It mechanically couples the circuit or die to the substrate. It decreases residual stress and thermal fatigue in solder joints between the circuit or die and the substrate.

Underfilling needs to have low void formation, good wetting characteristics, significant adhesion, low stress buildup, and high thermal conductivity. Voids act as hot spots and weak points in thermal fatigue tests. Thus they reduce the lifetime of the product. Lower viscosity reduces voids as trapped gas bubbles can migrate to the surface more quickly in low viscosity blends. Depending upon the application underfilling may need a high glass transition temperature so that it maintains high modulus at higher temperatures that may be generated in some electronic applications. In these higher temperature applications good thermal stability is also required so that the physical properties essential to the bond and support functions do not decrease significantly enough to cause a failure in one or more electrical connections.

Benzoxazines is used herein to refer to any chemical compound that has the characteristic benzoxazine ring. Benzoxazines are prepared by reacting a phenolic compound with an aldehyde and an amine, desirably an aromatic amine. U.S. Pat. No. 5,543,516, hereby incorporated by reference, sets forth a generally solventless method of forming benzoxazines. Optionally, solvents can be used to prepare benzoxazines as is well known to the art. The reaction time can vary widely with reactant concentration, reactivity and temperature. Times desirably vary from a few minutes for solventless to a few hours, e.g. 6 or 10 for diluted reactants. If a water based solution of formaldehyde is used as one reactant then a water miscible organic solvent is sometimes desirable. If one or more reactant is a liquid it may be used to dissolve the other components. If all of the components are solids they may be premixed as solids and then melted or first melted and then mixed. The temperature of reaction can be determined by routine experimentation noting the formation of benzoxazine and less desired products and optimizing temperature and time for a desirable product. Desirable temperatures are from about 0° C. to about 250° C., and preferably from about 0 or 50° C. to about 150° C.

The benzoxazine synthesis reaction may be conducted at atmospheric pressure or at a pressure up to about 100 psi. In some instances, a reaction carried out under pressure constitutes a preferred mode since fewer byproducts are produced. When a polyfunctional benzoxazine is being prepared, higher pressures generally results in relatively higher amounts of difunctional benzoxazine monomers.

The relative amounts of reactants required will depend upon their chemical nature, e.g., the number of reactive groups taking part in the reaction. The stoichiometry is well within the skills of those conversant with the art, and the required relative amounts of reactants are readily selected depending upon the functionality of the reacting compounds.

The ultimate reaction mixture contains the desired benzoxazine monomer and oligomers thereof, as well as impurities. If desired, the mixture may be purified to obtain a more concentrated form of the product described, for example by well-known crystallization or solvent washing techniques. The resulting product can be partially or fully shaped by melt processing in conventional polymer and/or composite processing equipment. It can be polymerized by heating the monomer, for instance, to from about 120 to 260° C. if no further initiator or catalyst is added.

The polymerization of benzoxazine monomers to a polymer is believed to be an ionic ring opening polymerization which converts the oxazine ring to another structure, e.g. linear polymer or larger heterocyclic rings. It is thought that a chain transfer step(s) limits the molecular weight of the resulting polymer and causes some branching. FTIR (Fourier transform infrared) analysis is often used to monitor the conversion of the oxazine rings to polymers to provide an estimate of the rate of polymerization at different temperatures. NMR (nuclear magnetic resonance) spectroscopy can also be used to monitor conversion of benzoxazine monomers to polymer.

The benzoxazine polymerization can also be initiated by the class of cationic initiators know as Lewis acids in addition to the other known cationic initiators. These include metal halides such as $AlCl_3$, $AlBr_3$, $BF_3$, $SnCl_4$, $SbCl_4$, $ZnCl_2$, $TiCl_5$, $WCl_6$, $VCl_4$, $PCl_3$, $PF_5$, $SbCl_5$, $(C_6H_5)_3C^+$ $(SbCl_6)^-$, and $PCl_5$; organometallic derivatives such as $RAlCl_2$, $R_2AlCl$, and $R_3Al$ where R is a hydrocarbon and preferably an alkyl of 1 to 8 carbon atoms; metallophorphyrin compounds such as aluminum phthalocyanine chloride; methyl tosylate, methyl triflate, and triflic acid; and oxyhalides such as $POCl_3$, $CrO_2Cl$, $SOCl_2$, and $VOCl_3$. Other initiators include $HClO_4$ and $H_2SO_4$. The Lewis acid initiators are often used with a proton or cation donor such as water, alcohol, and organic acids.

The polymer from the polymerization of the benzoxazine monomers can be partially or fully converted to a high carbon char by heating in an atmosphere of air, nitrogen or other gas to a temperature from about 400° C. to about 700, 800 or 1000° C. The yield of char on heating to 800° C. in nitrogen is desirably at least 30 wt. % and can exceed 65, 70 or 72 wt. %.

The aldehyde reactants include vaporous formaldehyde; paraformaldehyde; polyoxymethylene; as well as aldehydes having the general formula RCHO, where R is aliphatic, including mixtures of such aldehydes, desirably having from 1 to 12 carbon atoms.

The conventional phenolic reactants for benzoxazines include, for instance, mono and polyphenolic compounds having one or more phenolic groups of the formula

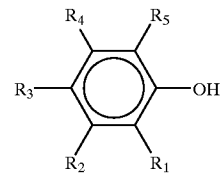

in which $R_1$ through $R_5$ can independently be H; OH; mono, di, or polyvalent aliphatics from 1 to 10 carbon atoms, linear or branched; mono, di, or polvalent aromatics having from 6 to 12 carbon atoms, combinations of said aliphatics and aromatics including phenols having from 7 to 12 carbon atoms; mono and divalent phosphines having up to 6 carbon atoms; mono, di and polyvalent amines having up to 6 carbon atoms or halogens. Desirably, at least one of the ortho positions to the OH is unsubstituted, i.e. at least one of $R_1$ to $R_5$ is hydrogen. In polyphenolic compounds one or more of the $R_1$ through $R_5$ can be an oxygen, an alkylene such as methylene or other hydrocarbon connecting molecule, etc. Further nonhydrogen and nonhalogen $R_1$ through $R_5$ groups as described above less one or more H or a P=O can serve to connect two or more phenolic groups creating a polyphenolic compound which can be the phenolic compound. Example or mono-functional phenols include phenol; cresol; 2-bromo-4-methylphenol; 2-allyphenol; 1,4-aminophenol; and the like. Examples of difunctional phenols (polyphenolic compounds) include phenolphthalane; biphenol; 4-4'-methylene-di-phenol; 4-4'-dihydroxybenzophenone; bisphenol-A; 1,8-dihydroxyanthraquinone; 1,6-dihydroxnaphthalene; 2,2'-dihydroxyazobenzene; resorcinol; fluorene bisphenol; and the like. Examples of trifunctional phenols comprise 1,3,5-trihydroxy benzene and the like. Polyvinyl phenol is also a suitable component for the benzoxazine compounds that constitute the subject of the invention.

In the application it is preferred that the phenolic resin used to form the benzoxazine monomer be neither a novolac nor a resole resin (e.g. preferably the phenolic novolac and resole resins are excluded). Phenolic novolac resins have the structure

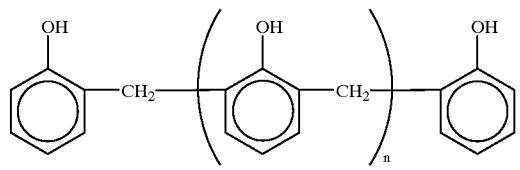

where n is from 0, 1, 2 etc., up to 5, 10 or 100. When novolac resins are reacted with formaldehyde, and an amine (e.g., aniline

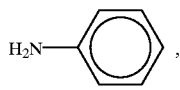

only the terminal phenols can form benzoxazine rings since the ortho-substituted phenolic repeating units in the middle of the novolac resin have no available ortho positions (with respect to the hydroxyl group) to form benzoxazine rings. The remaining phenol groups act as catalysts.

While novolac and resole resins are preferably excluded as phenolic compounds to form benzoxazine monomers other similar resins, e.g. bisphenol F

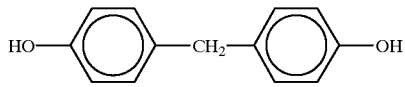

are preferably included. Bisphenol F differs from novolac resins where n=o in that the bisphenol F is entirely para-substituted. Thus, a novolac resin where n=o does not include bisphenol F.

Preferred phenolic compounds include,

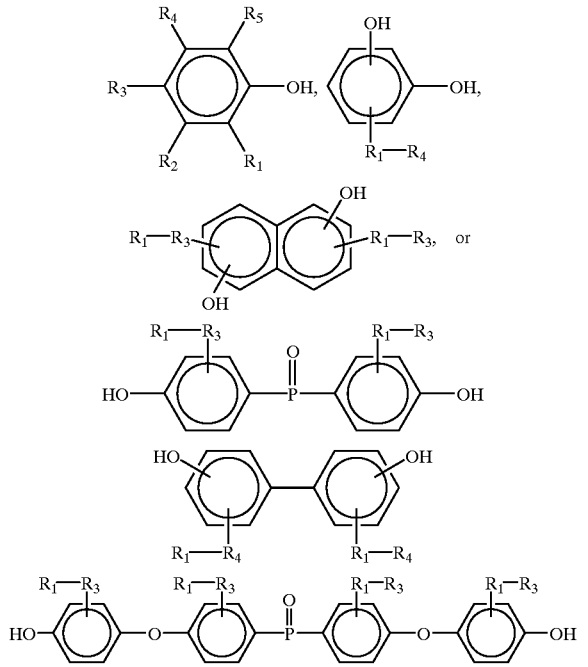

Where $R_1$–$R_5$ are as described above, or combinations thereof.

Amine reactants for forming the benzoxazines include mono, di, and polyfunctional amines desirably having from 2 to 40 carbon atoms and optionally including heteroatoms of O, N, S, and halogen. The amine can be aliphatic, aromatic, alkyl substituted aromatic or aromatic substituted alkyl. For the purposes of this paragraph, the primary amine is the functional group. The amine needs to have at least one primary amine to form a benzoxazine ring but may include secondary amine group(s) or any other functional group. If the amine is a di or polyamine, it may (under the right conditions) be reacted with two or more different phenols and aldehydes forming a benzoxazine monomer with two or more benzoxazine rings. Examples of difunctional amines are

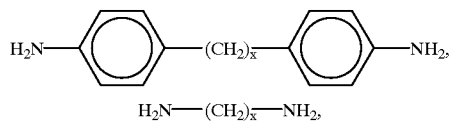

where x is a value from 1 to
Preferred amines include,

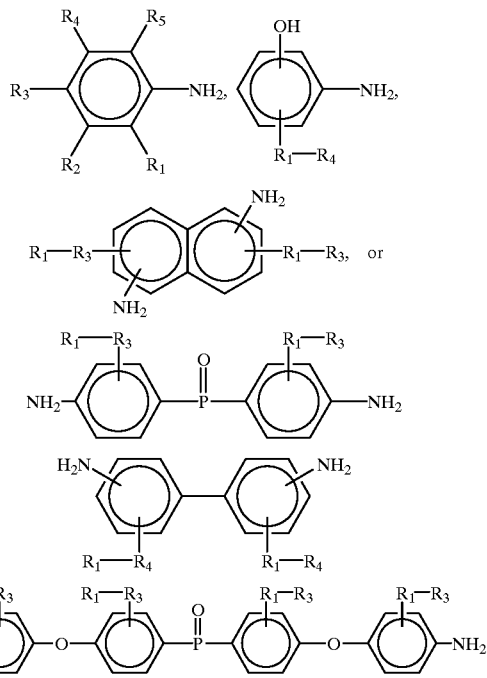

Where $R_1$–$R_5$ are as described above for phenolics, or combinations thereof. The amine may be an oligomeric or polymeric amine such as an amine terminated polyester, polyether, polydiene, diene copolymer, polyamide, polysiloxane, etc.

Epoxy reactant is used herein to refer to any chemical compound that has the characteristic oxirane ring. A commonly used epoxy is based upon bisphenol A and epichlorohydrin reacted to form the diglycidyl ether of bisphenol A. The formula for this compound is given below.

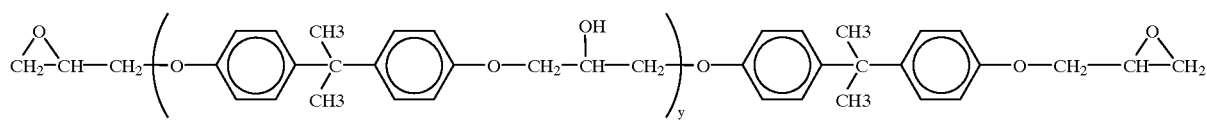

where y is from 0 to 10, 20, or 30. When y is 0 or 1 the compound is a liquid at 25° C. This is an example of an aromatic epoxy. Higher molecular weight epoxy compounds are generally tougher than lower molecular weight compounds.

Aliphatic epoxies may be useful instead of aromatic epoxies or in addition to aromatic epoxies when particular properties are desired. Aliphatic epoxies can be formed from the reaction of alcohols, glycols, and polyols with epichlorohydrin. Aliphatic epoxies can also be formed from polyolefinic compounds such as animal and vegetable oils, polyesters, polyether, butadiene derivatives etc. by processes such as peracetic acid oxidation of a double bond in the starting material.

Cycloaliphatic epoxies can be prepared by the oxidation (e.g. by peracetic acid) of cycloaliphatic olefins.

Novolac epoxies can be used and are prepared by reacting a phenol or a substituted phenol with formaldehyde to create methylol groups and then reacting that product with epichlorohydrin. Epoxies formed from novolacs are well known and commercially available.

Brominated epoxies are useful for specific applications, especially where flame retardency is desired. Brominated epoxies generally are defined as those epoxies with from about 15–50 weight percent bromine and generally one or more epoxy groups per molecule. An example of a brominated epoxy is tetrabromobisphenol A reacted with epichlorohydrin.

Depending on the amount of epoxy reactant in the blend and the presence of phenolic resin or phenolic molecules, a hardener for the epoxy reactant may or may not be necessary. Typical hardeners for epoxies include aliphatic amines, polyamides, phenol/urea/melamine, formaldehyde and Lewis acid catalysts. In addition crosslinking agents such as an anhydride may be added.

The phenolic resins useful in the blends include the reaction products of phenolic compounds and an aldehyde such as formaldehyde. These are generally classified as novolac or resole. Phenolic resins are known for their heat resistance, dimensional stability, creep resistance and ability to retain tight dimensional tolerances. Resole resins are known as one step resins. A molar excess of formaldehyde to phenol is usually used such as 1.15 or greater. The reaction between the formaldehyde and phenolic compound is usually stopped before the crosslinking reaction has proceeded to any significant extent. Thus the resin is still moldable when the resin is transferred to the mold. When additional heat or catalysts are added by the molder, the crosslinking reaction proceeds and the resin is converted from a thermoplastic to a thermoset.

A novolac resin uses a different procedure, using less than stoicheometric amount of formaldehyde with respect to the phenolic compound and a slightly acidic solution. The crosslinking reaction does not need to be controlled as stringently in the preparation step as the stoichiometry prevents undue crosslinking. A formaldehyde source (e.g. hexamethylenetetramine) is added prior to or during molding to change the stoichiometry and allow crosslinking to a thermoset to occur. Hexamethylenetetramine upon heating breaks down to ammonia and formaldehyde which crosslinks the network.

The glass transition temperature (Tg) of the ternary blend is important because the modulus varies greatly below and above the Tg. It is desirable that the Tg be above 80° C., more desirably above 120 or 150° C. and preferably above 170° C.

The ternary blend also desirably has good thermal stability. This means that the ternary blend does not discolor, degrade, or become overly crosslinked when exposed to high temperatures.

Desirably the benzoxazine portion of the ternary blend polymerizes or cures at a temperature less than 150° C. and desirably the lower the polymerization temperature the better as polymerization can be accomplished at a temperature less harmful on the other components for the substrate or circuit.

The blends of this disclosure are useful for a variety of applications including adhesive and molded applications. Thus the blends would be useful as adhesives where their low flammability is important (e.g. airplane interiors etc.) or where their thermal stability and easily modified physical properties such as modulus, tensile strength, and coefficient of expansion would be of value. They could also be used in filled or unfilled molding applications such as alternatives to things like epoxies or vinyl ester resins in fiber reinforced composites such as circuit boards. Heat curable compositions are preferred.

EXPERIMENTAL

Unless otherwise specified the benzoxazine component in the examples is the product from reacting bisphenol A, formaldehyde and aniline (BA-a). Any benzoxazine as specified above can be used instead. The benzoxazine was purified for the curing studies but used without purification when preparing cured specimen. The epoxy reactant was Epon 825 being the monomeric reaction product of 1 mole of bisphenol A and 2 moles of epichlorohydrin and available from Shell Chemical. Epon 828 could have been used and varies by including about 10 weight percent chain extended molecules having 2 or more bisphenol A segments per molecule. The phenolic resin was a novolac HRJ1166 from Schenectady International in Schenectady, N.Y.

The binary and ternary blends were hand mixed in an aluminum pan for a few minutes until a homogeneous mixture was formed. The samples were thermally cured at 200° C. and a pressure of 0.1 MPa for 1 hour and then cooled in the mold for 2 hours before using or testing. When modulated differential scanning calorimetry (MDSC) was run, the samples were sealed in hermetic aluminum pans with lids. They were isothermally equilibrated 10 minutes at −10° C. The temperature amplitude was ±1° C. with a period of 70 seconds and a ramp of 5° C./minute to 310° C. The Tg was taken by rerunning the experiment twice using the same conditions to insure complete curing. The temperature at half extrapolated tangents of the step transitions midpoint was used as the glass transition temperature.

Dynamic mechanical analysis (DMA) was performed on specimen measuring 51×13×2.5 mm using a rectangular torsion fixture. Strain was applied sinusoidally with a frequency of 1 Hz with a temperature sweep specifying heating 2° C./minute from 30° C. to above the glass transition temperature of the material.

The thermogravimetric analysis was done with a heating rate of 20° C./minute under nitrogen from 30 to 900° C.

EXAMPLE 1

A modulated differential scanning calorimetry test (MDSC) was conducted on benzoxazine, phenolic novolac, and epoxy samples between 5 and 310° C. The benzoxazine showed a curing exotherm at 230° C. while the phenolic resin and epoxy reactant (both without curatives) showed no sign of curing reactions. Epoxy showed an endotherm at 280° C. which was believed to be due to evaporation of the monomer.

EXAMPLE 2

Blends of epoxy and benzoxazine in weight ratios of 1:3, 1:2, 1:1, 2:1, and 3:1 were subjected to MDSC testing from 5 to 310° C. As the amount of epoxy increased, the curing reaction of benzoxazine shifted to higher temperatures. At an epoxy to benzoxazine ratio of 2:1 or greater the exotherm showed two peaks, one at 240–250° C. attributed to the polymerization (curing) among benzoxazines and the second at 290–300° C. attributed to a reaction between benzoxazine and epoxy.

EXAMPLE 3

Blends of benzoxazine and phenolic resins with weight ratios from 3:1, 2:1, 1:1, 1:2, and 1:3 were subjected to the MDSC test. The polymerization (curing) of benzoxazine shifted from 190° C. to about 145° C. with increasing amounts of phenolic resin.

EXAMPLE 4

Blends of phenolic resin and epoxy resins with weight ratios from 3:1, 2:1, 1:1, and 1:3 were tested in the MDSC. The thermogram showed no maxima within the range of 30–300° C. although the onset of an exotherm which may be either curing or degradation was observed. The experiments above can be summarized to teach that adding epoxy to benzoxazine can retard curing while adding phenolic resins to benzoxazine can accelerate curing by causing benzoxazine polymerization to occur at lower temperatures. Thus while the addition of epoxies to benzoxazines may lower the viscosity of the benzoxazines, they can increase the polymerization temperature of the benzoxazine above the desire polymerization temperatures. The curing of epoxy and phenolic novolac blends does not readily occur below 310° C. without an acid catalyst.

EXAMPLE 5

An MDSC test was run on cured ternary blends of benzoxazine, epoxy, and phenolic novolac in weight ratios of 1:1:1, 1:2:1, and 1:3:1 (ratio of benzoxazine to phenolic was 1:1 and epoxy amount was increased). Increasing amounts of epoxy resin were found to decrease the modulus of the blend at 25° C. as the epoxy resin has a low Tg (about 100–140° C.) relative to the benzoxazine and phenolic components which have a Tg of about 170° C. However between 170 and 300° C. the modulus was higher in the ternary blends with the higher epoxy content indicating more crosslinks (higher crosslink density) due to an increased amount of the epoxy component.

The thermal stress in an underfilling application is roughly estimated by the equation: $\sigma = \int E(T) \Delta \alpha(T) dT$, where $\sigma$ is the thermal stress, $E(T)$ is the temperature dependent elastic modulus of the underfilling (encapsulant) and $\Delta \alpha(T)$ is the difference between the thermal expansion coefficients of the underfilling and the microchip. Thus the thermal stress ($\sigma$) can be decreased by lowering the modulus of the underfilling or lowering the mismatch of the thermal coefficient of expansion between the microchip and the encapsulant. The epoxy resin in the ternary blend can lower the modulus thereby decreasing the thermal stress when the temperature of the microchip changes. The ability to lower the viscosity of the blend also allows addition of fillers that may lower the mismatch in thermal conductivity Based on dynamic mechanical analysis of the ternary blends, the larger amounts of epoxy resin increased the Tg of the blend by 10° C. from about 140° C. to about 150° C. A higher Tg means the blend retains its higher glassy modulus longer as it is heated to higher temperatures. As a Tg of at least 125° C. is required for many applications, the ability to increase the Tg is desirable.

EXAMPLE 6

Analysis of the tan δ of the ternary blends from dynamic mechanical analysis indicated the loss tangent decreased with increasing epoxy content. This indicates the ternary blends with higher epoxy content are more elastic. The softer ternary blends (with higher epoxy content) will thus provide softer tough underfilling (encapsulant) less like to fail by cracking.

While in accordance with the Patent Statutes the best mode and preferred embodiment have been set forth, the scope of the invention is not limited thereto but rather by the scope of the attached claims.

What is claimed is:

1. A ternary composition comprising:
   a) from about 10 to about 80 weight percent of a benzoxazine monomer,
   b) from about 10 to about 80 weight percent of an epoxy reactant, and
   c) from about 1 to about 80 weight percent of a phenolic resin or phenolic compound wherein said weight percents are based upon the total binder from a, b, and c in said composition, and said benzoxazine monomer comprising on average at least two benzoxazine rings per molecule.

2. A composition according to claim 1, used as an underfilling in electronic packaging, electronic encapsulation, a matrix for composite material, a coating, or an adhesive.

3. A composition according to claim 1, wherein the viscosity of the blend of the "a, b, and c" components measured at 100° C. with a Rheometrics RMS-80 with a shear rate of 6.3 reciprocal seconds is less than the viscosity of the "a" component.

4. A composition according to claim 2, wherein the composition has a viscosity at 100° C. that increases less than 50% upon aging 60 minutes at 100° C.

5. A composition according to claim 1, wherein said benzoxazine is present from about 10 to about 70 weight percent, said epoxy reactant is present from about 10 to about 70 weight percent, and said phenolic resin or phenolic molecule is present from about 2 to about 50 weight percent.

6. A composition according to claim 1, further including a cationic ring-opening initiator for polymerizing said benzoxazine.

7. A composition according to claim 2, further including initiator and/or catalyst for polymerizing said epoxy resin, which may or may not include crosslinkers for the epoxy resin.

8. A composition according to claim 6, wherein said initiator comprises $AlCl_3$, $AlBr_3$, $BF_3$, $SnCl_4$, $ZnCl_2$, $WCl_6$, $VCl_4$, $PCl_3$, $PF_5$, $PCl_5$, $PCl_3$, $TiCl_5$, $SbCl_4$, $SbCl_5$, or $(C_6H_5)_3 C^+(SbCl_6)^-$, $RAlCl_2$, $R_2AlCl$, or $R_3Al$ where R is a hydrocarbon and preferably an alkyl of 1 to 8 carbon atoms; metallophorphyrin compounds; methyl tosylate, methyl triflate, or triflic acid; $POCl_3$, $CrO_2Cl$, $SOCl_2$, or $VOCl_3$; or $HClO_4$ or $H_2SO_4$.

9. A composition according to claim 1, wherein said benzoxazine monomer further comprises a mixture including at least one benzoxazine monomer with only one benzoxazine ring per molecule and at least a second benzoxazine monomer with at least 2 benzoxazine rings per molecule, and wherein said epoxy reactant has on average about two epoxy group or more per molecule.

10. A composition according to claim 1, wherein said epoxy reactant comprises a mixture of at least one epoxy with only one epoxy ring per molecule and at least one epoxy with two or more epoxy rings per molecule.

11. A composition according to claim 1, wherein said epoxy reactant comprises at least one epoxy with 3 or more epoxy groups per molecule.

12. A composition according to claim 1, wherein said phenolic resin is a novolak or resole phenolic resin.

13. A composition according to claim 1, further including a carboxylic acid or a phenolic molecule.

14. A composition according to claim 1, wherein the blend after curing has a glass transition temperature of at least 80° C.

15. A composition according to claim 1, wherein the blend after curing has a glass transition temperature of at least 150° C.

16. A composition according to claim 1, including a curing agent or cure accelerator for the phenolic resin.

17. A composition according to claim 1, wherein said benzoxazine is present from about 15 to about 65 weight percent, said epoxy reactant is present for about 20 to about 70 weight percent, and said phenolic resin or phenolic molecule is present from about 2 to about 50 weight percent, and wherein said benzoxazine is a reaction product of bisphenol A, formaldehyde and a primary amine; wherein said epoxy resin is the reaction product of bisphenol A and epichlorohydrin, and wherein said phenolic resin or phenol compound is a phenolic novolac resin.

18. A ternary composition consisting essentially of:
   a) from about 10 to about 80 weight percent of a benzoxazine monomer;
   b) from about 10 to about 80 weight percent of an epoxy reactant;
   c) from about 1 to about 80 weight percent of a phenolic resin or phenolic compound wherein said weight percents are based upon the total binder from a, b, and c in said composition;
   d) optionally, a cationic ring opening initiator for polymerizing said benzoxazine;
   e) optionally, an initiator and/or catalyst for polymerizing said epoxy resin; and
   f) optionally, a curing agent or cure accelerator for the phenolic resin.

19. A composition according to claim 18, wherein said benzoxazine monomer comprises on average at least two benzoxazine rings per molecule, wherein said epoxy reactant has on average about 2 epoxy groups or more per molecule, and wherein said phenolic resin is a novolac or resole phenolic resin.

20. A composition according to claim 19, wherein said benzoxazine is a reaction product of bisphenol A, formaldehyde and a primary amine, wherein said epoxy resin is a reaction product of bisphenol A and epichlorohydrin, and wherein said phenolic resin or phenolic compound is a phenol novolac resin, and wherein said composition is utilized as an under filling in electronic packaging, electronic encapsulation, a matrix for composite material, a coating, or an adhesive.

* * * * *